(12) United States Patent
Wheelbarger et al.

(10) Patent No.: US 8,574,101 B2
(45) Date of Patent: *Nov. 5, 2013

(54) TRAINING DEVICE TO ENHANCE HAND-EYE COORDINATION

(71) Applicant: Fullcourt Tennis LLC, Mt. Pleasant, SC (US)

(72) Inventors: Karmen Lee Wheelbarger, Ocala, FL (US); Leonard Joseph Schloss, Mt. Pleasant, SC (US)

(73) Assignee: Fullcourt Tennis LLC

( * ) Notice: Subject to any disclaimer, the term of this patent is extended or adjusted under 35 U.S.C. 154(b) by 0 days.

This patent is subject to a terminal disclaimer.

(21) Appl. No.: 13/670,992

(22) Filed: Nov. 7, 2012

(65) Prior Publication Data

US 2013/0196794 A1    Aug. 1, 2013

Related U.S. Application Data

(63) Continuation-in-part of application No. 13/291,345, filed on Nov. 8, 2011, now Pat. No. 8,333,671.

(51) Int. Cl.
*A63B 69/00* (2006.01)

(52) U.S. Cl.
USPC ............................ 473/422; 473/451; 473/417

(58) Field of Classification Search
USPC ......... 473/422, 451, 417, 438, 446, 454, 455, 473/459
See application file for complete search history.

(56) References Cited

U.S. PATENT DOCUMENTS

| 4,830,371 | A | * | 5/1989 | Lay | 473/423 |
| 5,203,558 | A | | 4/1993 | An | |
| 5,494,278 | A | * | 2/1996 | Linden | 473/427 |
| 5,685,542 | A | * | 11/1997 | Weis | 473/459 |
| 5,797,810 | A | * | 8/1998 | Sandoval | 473/423 |
| 7,070,521 | B2 | * | 7/2006 | Bayduke | 473/438 |
| 7,169,067 | B2 | * | 1/2007 | Town | 473/417 |
| 7,861,699 | B2 | * | 1/2011 | Gowan et al. | 473/415 |
| 7,887,441 | B1 | * | 2/2011 | Archer | 473/417 |
| 7,892,116 | B2 | * | 2/2011 | Kellogg | 473/451 |
| 8,333,671 | B1 | * | 12/2012 | Wheelbarger et al. | 473/422 |
| 2004/0214664 | A1 | * | 10/2004 | Marra et al. | 473/422 |
| 2006/0035730 | A1 | * | 2/2006 | Nguyen | 473/417 |

* cited by examiner

*Primary Examiner* — Mitra Aryanpour
(74) *Attorney, Agent, or Firm* — H. Jay Spiegel

(57) ABSTRACT

A training device to enhance hand-eye coordination includes an illumination device for determining the proper time for an individual to strike a ball and to collect practice information for later evaluation. The device allows an individual to practice hitting a ball with a racket or bat, providing an immediate indication whether the ball has been properly struck. Also, an individual is provided with a record of his/her performance reviewable by a professional. The device includes a ball affixed to a flexible support assembly, the support and the ball reciprocating or pivoting when the ball has been struck. The location of the ball is constantly monitored each time the ball is struck. The amount of force applied to the ball when struck by an individual or implement can also be determined. Information relating to the manner in which the ball has been struck is recorded and is analyzed in real time.

30 Claims, 15 Drawing Sheets

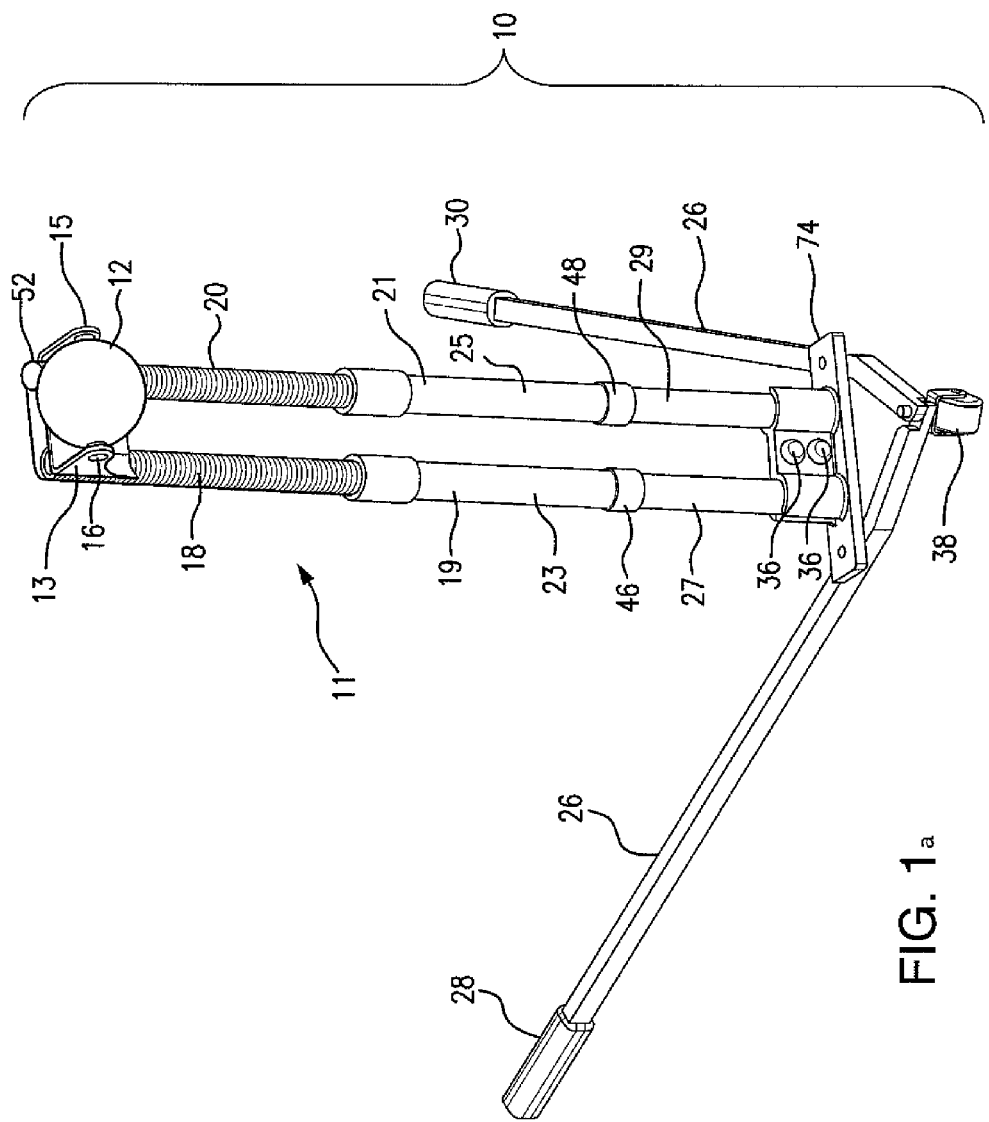

TRAINING DEVICE TO ENHANCE HAND-EYE COORDINATION

This application is Continuation-in-Part of application Ser. No. 13/291,345, filed on Nov. 8, 2011, now U.S. Pat. No. 8,333,671 B1. The present invention is directed to a training device to enhance hand-eye coordination, in the field of sport training devices, applicable to particular sports in which hand-eye coordination comes into play. Examples include tennis, racquetball, baseball, and others.

BACKGROUND OF THE INVENTION

Many individuals participate in sports both as a pastime, as well as a hobby. As can be appreciated, it is important when participating in a particular sport to develop a proper technique in playing the sport to increase an individual's level of skill, as well as to prevent injuries.

Therefore, many techniques have been developed for assisting an individual in improving their skill level. With respect to a sport involving hitting a ball, a number of different devices have been developed to enable an individual to better improve his or her performance. For example, and with respect to a racquet sports such as tennis, racquetball or squash, U.S. Pat. No. 2,003,558 to An teaches the use of a training device provided with a uni-directional flexible spinner. This device includes a ball mounted on a flexible support column. In use, the individual strikes the ball at a top most position, forcing the ball away from the individual. Once the ball provided on the support column reaches a first position away from the top-most position, it returns from this position to a position closer to the individual. At this point, the ball then oscillates back and forth until it again reaches the top-most position. During the use of this training device, the individual endeavors to strike the ball when it returns to the top-most position. This type of device allows an individual to practice his or her technique in properly striking the ball without the necessity of including a partner in the training technique. However, the device described in the An patent does not afford the individual with any indication that the ball was properly struck.

SUMMARY OF THE INVENTION

The present invention relates to a training device to enhance hand-eye coordination.

It is, therefore, an object of the present invention to provide a sport training device, such as a reciprocating ball sports trainer, to assist an individual practice hitting a ball with an implement, such as, but not limited to a tennis racket.

It is a further object of the present invention to provide a sport training device including an illumination device for determining the proper time for the individual to strike the ball and to collect practice information for later evaluation.

It is yet another object of the present invention to provide a sport training device with various sensors for determining whether the ball has been properly struck.

The present invention addresses the deficiencies of the prior art by providing a sport training device, such as a reciprocating ball sports trainer, allowing an individual to practice hitting a ball with an implement such as a racket or bat, as well as providing an immediate indication whether the ball has been properly struck. In addition, the individual is provided with a record of his or her performance which can be reviewed by themselves or a professional. This is accomplished by providing a reciprocating ball sports trainer including a ball affixed to a flexible support assembly, and allowing the support and the ball which is attached thereto to reciprocate or pivot when the ball has been struck. The location of the ball is constantly monitored each time the ball is struck. The amount of force applied to the ball when struck by an individual or implement can also be determined. Information relating to the manner in which the ball has been struck is recorded and is analyzed in real time or after a practice session has been completed. The reciprocating ball sports trainer is fitted with wheels, skid pads or traction pads, allowing the sport training device to be steered, freewheeled, braked or slid after each impact with the ball. The direction and amount of travel of the sport training device can be controlled by varying the degrees of the wheels and/or the amount of resistance to movement.

A ball motor/generator is located in proximity to the ball. The ball motor/generator detects rotation of the ball. This is accomplished by monitoring pulses created by the rotation of the ball. Thereafter, the speed and direction of movement of the ball can be calculated. In addition, the motor/generator can assist the individual to spin the ball and create the effect of top or back spin. The amount of spin produced by hitting the ball is augmented or reduced through the use of a spin retarder placed in proximity with the motor/generator.

The present invention also includes a timing light providing a light which illuminates a lens when the ball has reached the exact point at which it should be hit by the user, for example, the top dead center point. The timing light uses a light source located in the bottom of the flexible support assembly such as a hollow spring that also holds the ball. When the ball reaches the top of its arc, the timing light illuminates the lens or opaque cover provided at the top of the flexible support assembly resulting from the light passing unimpeded from the bottom of the flexible support assembly to the top of the flexible support assembly. This indicates that the ball has reached the top of the arc at the top dead center position. As the flexible support assembly bends past the top dead center, the light is no longer illuminating the lens or cover due to the bending of the flexible support assembly which blocks light transmission, thereby indicating to the individual that it would not be the proper time to strike the ball. This action is repeated each time the ball passes the top dead center point.

A timing sensor is provided producing a signal when the individual strikes the ball. The timing sensor includes an illumination device provided in the base of the flexible support assembly and a reflector provided at the top of the flexible support assembly in a direct line with the illumination device. Since the timing sensor is in direct line with the reflector, light impinges on the reflector only when the flexible support assembly is at the top dead center position. Light impinging upon the reflector is reflected back to the bottom of the flexible support assembly to be received by a photo detector. Therefore, if the ball is struck when the flexible support assembly is at the top dead center position, a signal is produced indicating that the ball was struck at the proper time. However, if the ball is struck when the flexible support assembly is not at the top dead center position, a signal is produced indicating that the ball was not struck correctly or at the proper time. A controller provided with a microprocessor and memory is used to calculate and store the number of "good hits" and the number of "bad hits." Additionally, an audio signal is produced when a "good hit" has been struck.

Information produced by the timing light and timing sensor, as well as sensed by the ball motor/generator is transmitted to the microprocessor within the base of the reciprocating ball sports trainer. The microprocessor includes a memory in which information generated by the reciprocating ball sports trainer is stored. This information, along with the output from the ball motor/generator is utilized to analyze the manner in which the user has struck the ball. The microprocessor provides real time, or post time information produced by the device. In addition, the device can display information relating to future goals, times, percentages, averages, correct and incorrect hits, impact velocity, as well as position data and any other information appropriate to the technique being developed by the individual. The reciprocating ball sports trainer can be internally or externally powered, recharged via external sources or internal such as kinetic energy generators, solar devices or other means. Real time monitoring by the user allows for real-time feedback, as well as possible interfacing to other interactive or storage devices such as a computer or some other user in real time with a like device such as a Wii. Information relating to the manner in which the individual is performing can be provided in a display included at the base of the sport training device.

Other objects and advantages of the present invention will become apparent from the following detailed description when viewed in conjunction with the accompanying drawings, which set forth certain embodiments of the invention.

BRIEF DESCRIPTION OF THE DRAWINGS

Preferred exemplary embodiments of the invention are illustrated in the accompanying drawings which the reference numerals represent like parts throughout in which:

FIG. 1a is a front perspective view of the reciprocating ball sports trainer;

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

As previously explained, the purpose of the inventive training device 10 is to allow an individual to practice hitting a ball 12 with any sort of implement, such as, but not limited to a tennis racquet, racquetball racquet, squash racquet and baseball bat. However, for purposes of simplicity, the present invention will be explained with respect to training an individual to properly strike a tennis ball with a tennis racket.

Figure 1B:
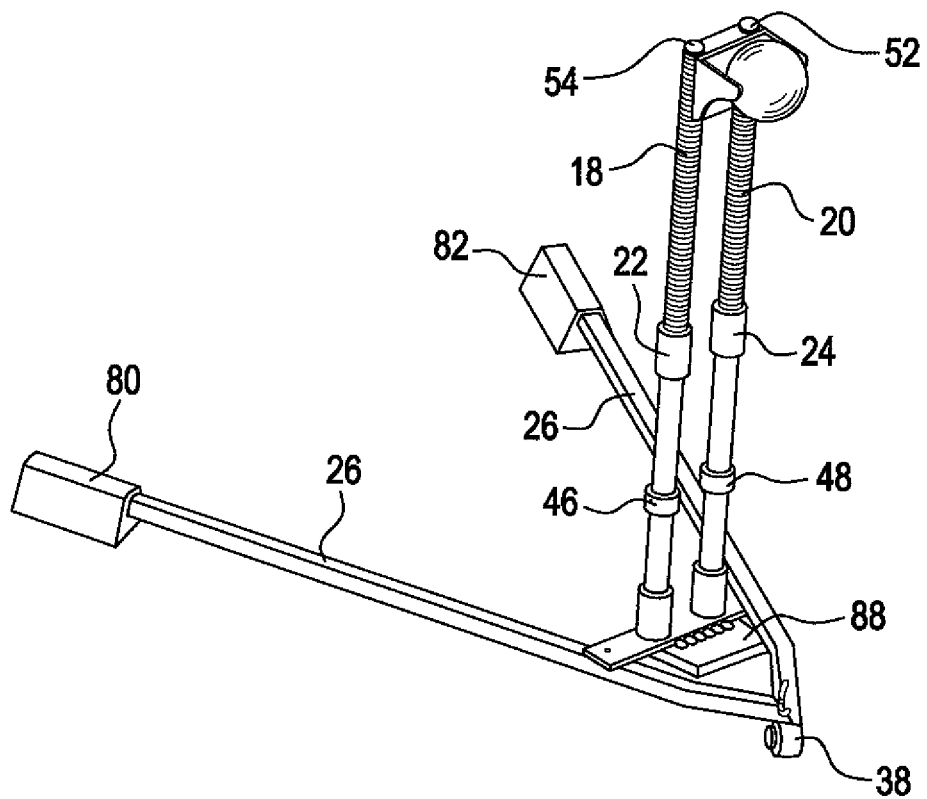
FIG. 1b is a side perspective view of the reciprocating ball sports trainer.
Figure 4:
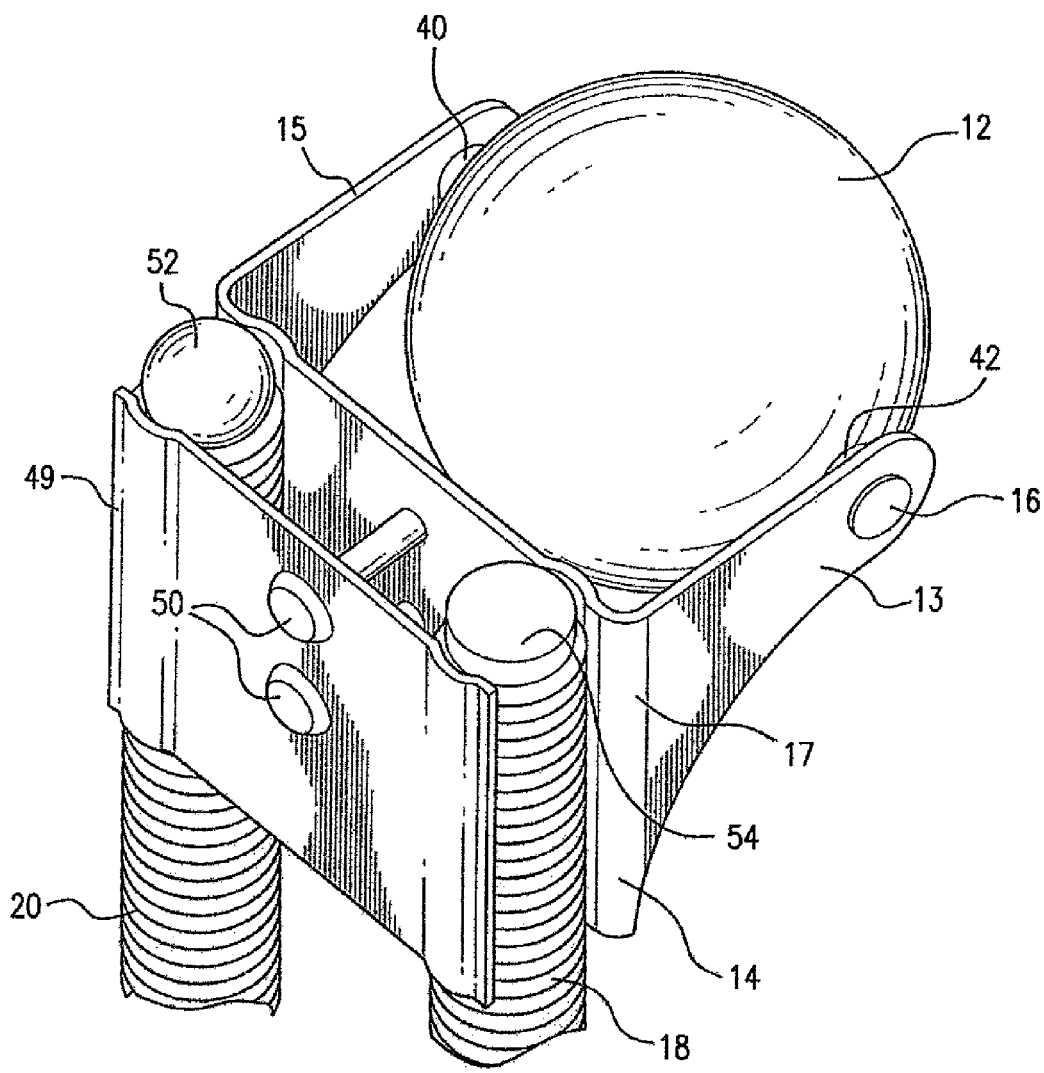
FIG. 4 is a detailed perspective view showing the top of the reciprocating ball sports trainer.
Figure 5A:
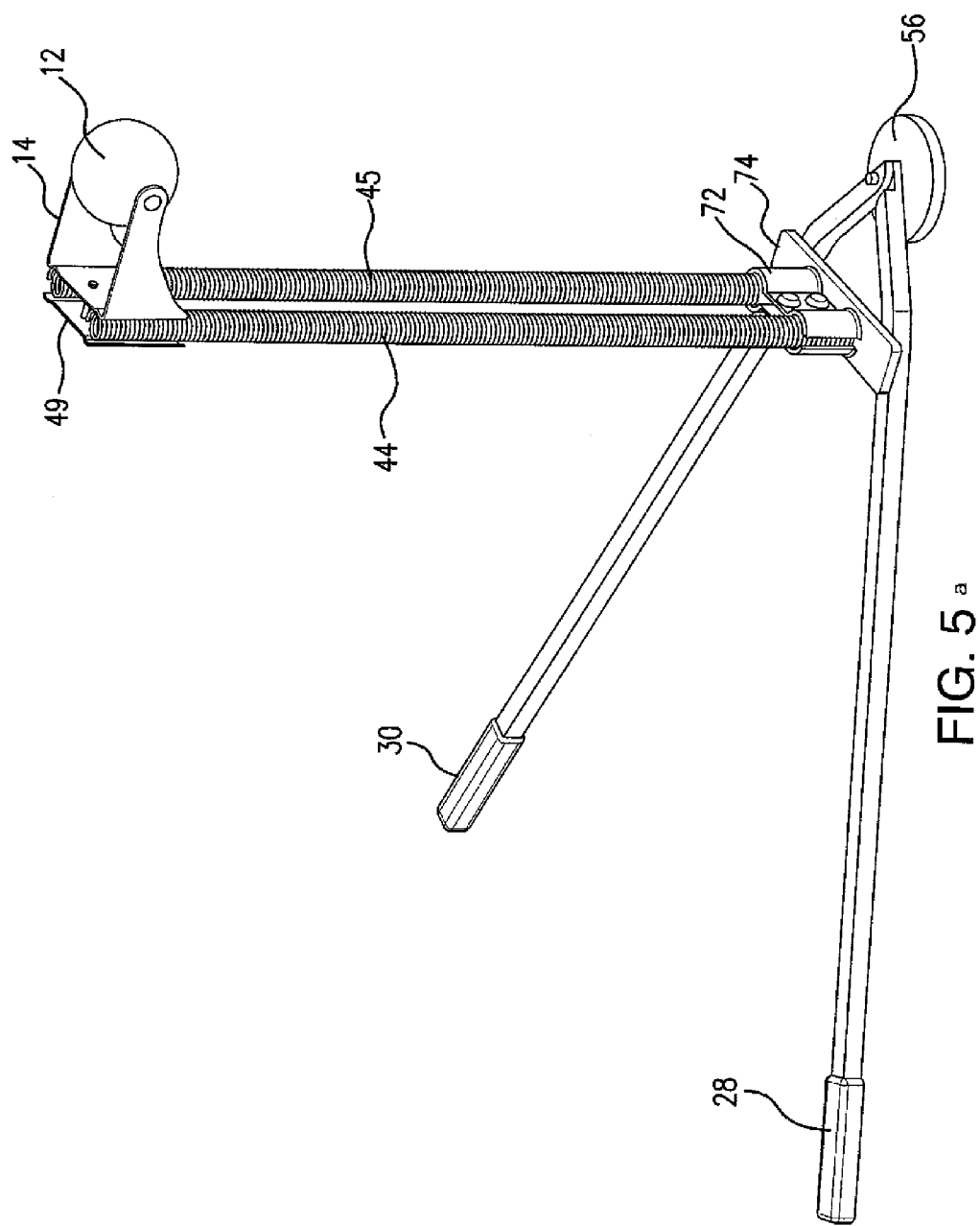
FIG. 5a is a side perspective view of the reciprocating ball sports trainer showing the use of a skid attached to the base of the reciprocating ball sports trainer.
Figure 7:
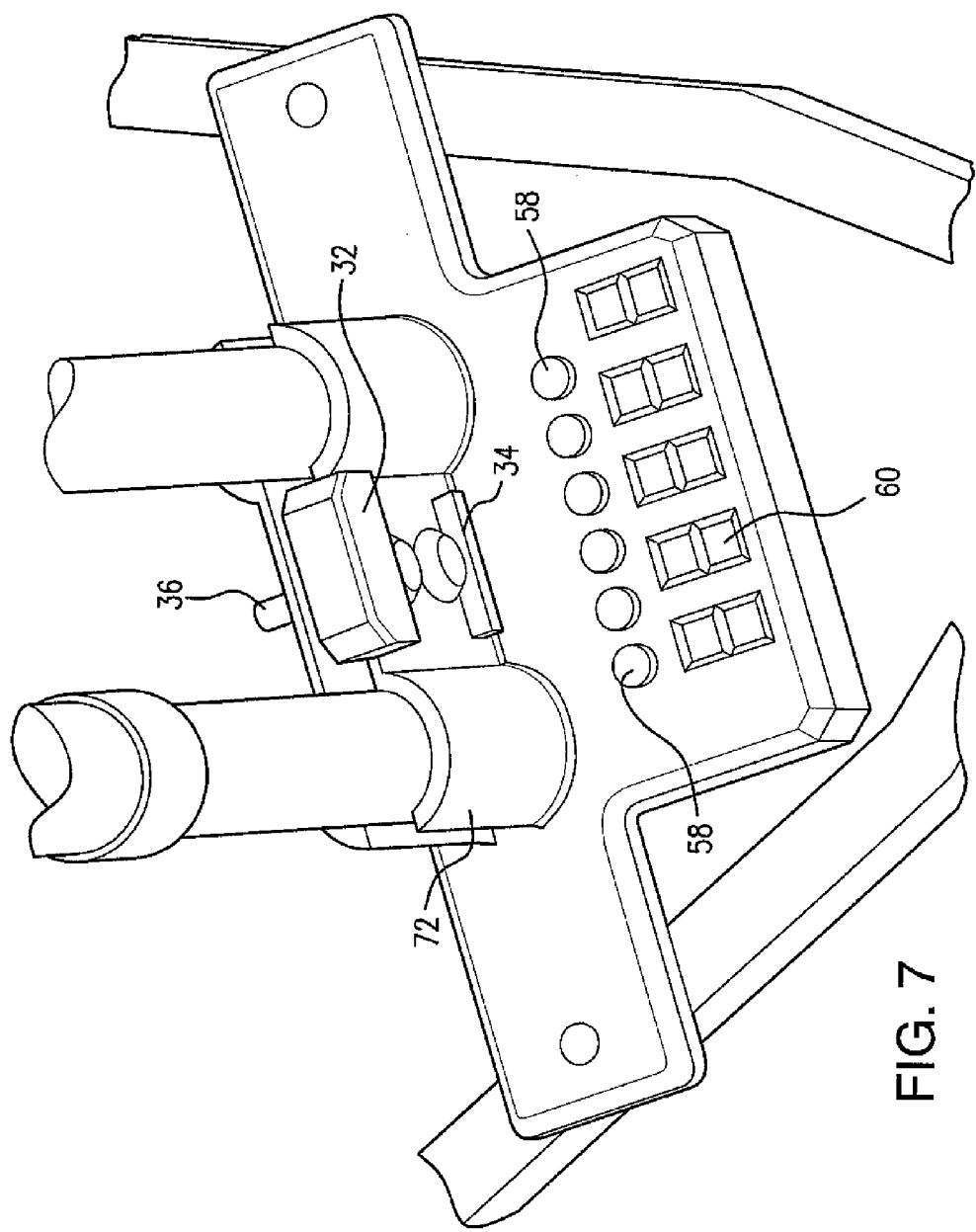
FIG. 7 is a detailed view showing the base of the reciprocating ball sports trainer.

The reciprocating ball sports trainer 10 (FIGS. 1a and 1b) includes a ball 12 attached to a flexible support assembly 11 including a first vertical spring 18 and a second vertical spring 20 parallel to the first vertical spring 18, as well as a first housing 22 and a second housing 24. A ball 12 is attached to a U-shaped ball mount 14 (FIGS. 1a and 3) with a portion of the ball 12 extending beyond the end of the ball mount 14 (FIGS. 2a and 5a) in such a manner to allow the ball 12 to rotate when struck by the tennis racket. One or more bolts 50 (FIG. 4) secure a back plate 49 to the ball mount 14, with the tops of the springs 18, 20 provided between the back plate 49 and the ball mount 14. As shown in FIGS. 1a and 2a, a portion of the springs 18, 20 will extend to, but not into the separate housings 22, 24, respectively. However, as shown in FIG. 5a, the housings 22, 24 can be eliminated. Both the vertical springs 18, 20 as well as the housings 22, 24 are hollow. The length of each housing 22, 24 is not crucial to the operation of the present invention and could extend very close to the top ball mount 14, or be provided a relatively large distance from the ball mount 14. Housing 22 includes a top outer tube portion 23 and a bottom inner tube portion 27. Housing 24 includes a top outer tube portion 25 and a bottom inner tube portion 29. A tightening ring 19 secures the bottom of spring 18 to the top of the top outer tube portion 23 and a tightening ring 21 secures the bottom of spring 20 to the top of top outer tube portion 25. Since individuals utilizing the reciprocating ball sports trainer 10 will be of different heights, it is important that the height of the ball 12 with respect to the individual could be adjusted so as to be the proper height for each individual. Therefore, the exterior of the housing 22 is provided with a first height adjustor 46 and the exterior of the housing 24 is provided with a second height adjustor 48. Movement of each of the height adjustors 46, 48 changes the height of each housing 22, 24 as well as the height of each of the springs 18, 20. Therefore, the height of the ball 12 and the ball mount 14 with respect to the individual user is adjustable to accommodate children as well as adults of varying heights. Both of the housings 22, 24 are attached to a base assembly 74 through the use of a spring clamp 72 and bolt 70 as shown in FIG. 7.

The height of the housing 22 or 24 is changed by telescoping the bottom inner tube portion 27 or 29, respectively, into or out of the top outer tube portion 23 or 25, respectively. In one example, the height adjustors 46, 48 are conical split rings which overlie the bottom inner tube portions 27, 29, respectively. As the height adjustor 46 is squeezed by a threaded sleeve 101, the split 109 narrows and it tightens the bottom tube 27 around the upper tube 23. Similarly, the length of housing 24 is changed by telescoping the upper inner tube portion 25 into or out of the lower outer tube portion 29. The height adjustor 48 is a ring with a split 111 which overlies the bottom inner tube portion 27. As the height adjustor 48 is squeezed by threading down sleeve 105, the split 111 narrows and it tightens the top outer tube portion 25 around the bottom inner tube portion 27. As can be appreciated, the height of both of the housings 22, 24 should be equal to one another during use of the reciprocating ball sports trainer 10.

Figure 5B:
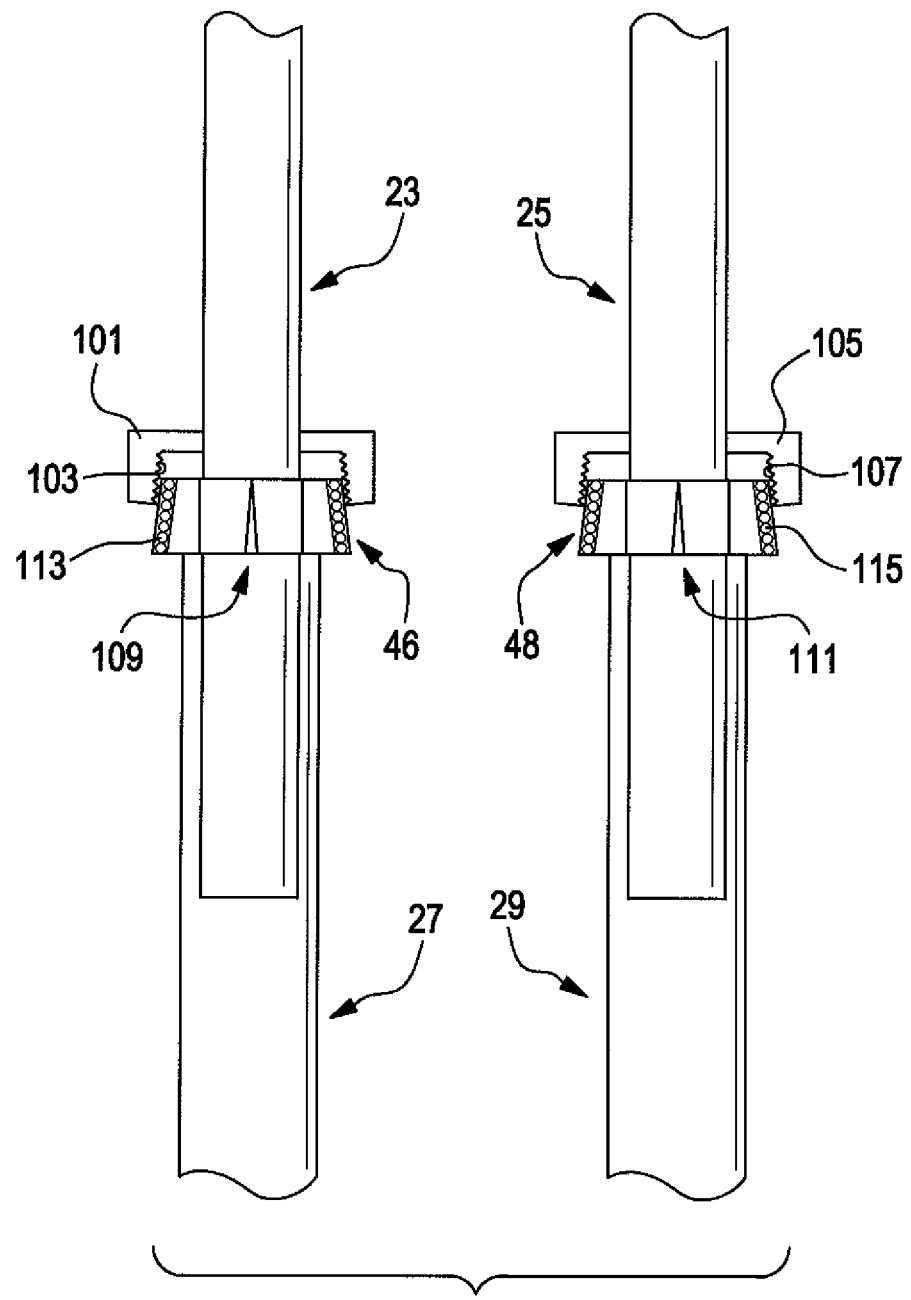
FIG. 5b shows details of height adjustment of the device.

With further reference to FIG. 5b, in more detail, it is seen that the rings 46 and 48 are conical in nature and have respective external threads 113 and 115 on their outer surfaces. Each ring is also split, with the ring 46 having a split 109 and the ring 48 having a split 111. With respect to the telescoping tubes 23, 27, a threaded locking sleeve 101 has internal threads 103 designed to enmesh with the threads 113 of the ring 46. As the sleeve 101 is rotated so that it descends over the ring 46, the conical nature of the ring 46 results in the split 109 narrowing, causing the ring 46 to clamp radially inwardly to therefore lock the vertical position of the tube 23 with respect to the tube 27. The respective upper tube portions 23, 25 may telescope within the respective lower tube portions 27, 29 or vice-versa as desired.

In the case of the tubes 25 and 29, similarly, the ring 48 is conical with external threads 115. The locking sleeve 105 has internal threads 107 that enmesh with the threads 115 of the ring 48. As the sleeve 105 is rotated to descend over the ring 48, the conical nature of the ring 48 results in the split 111 narrowing, causing the ring 48 to clamp down radially inwardly to lock the vertical position of the tube 25 with respect to the tube 29.

Figure 2:
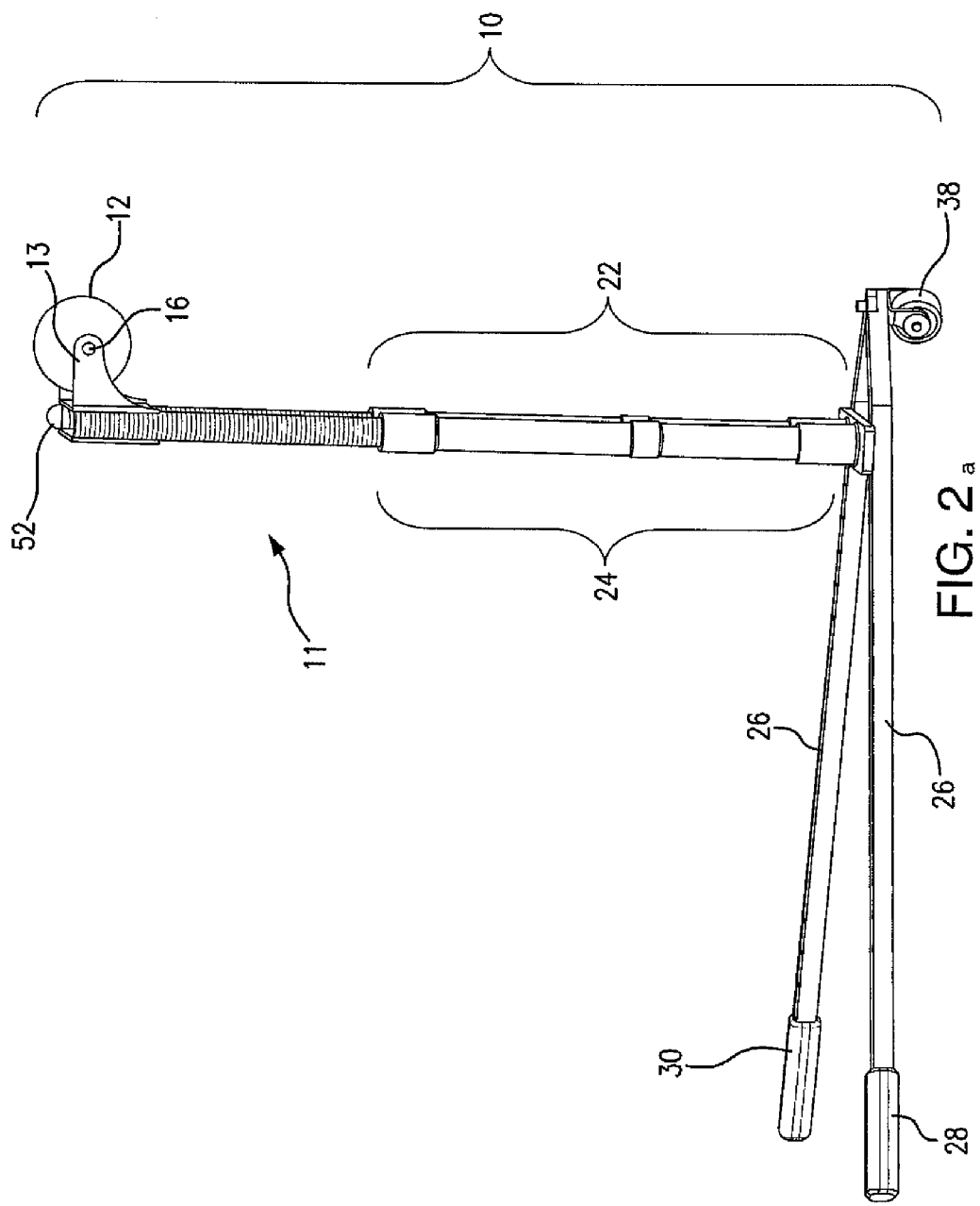
FIG. 2a is a side view of the sport training device.
FIG. 2b is a rear view of the sport training device.
Figure 2B:
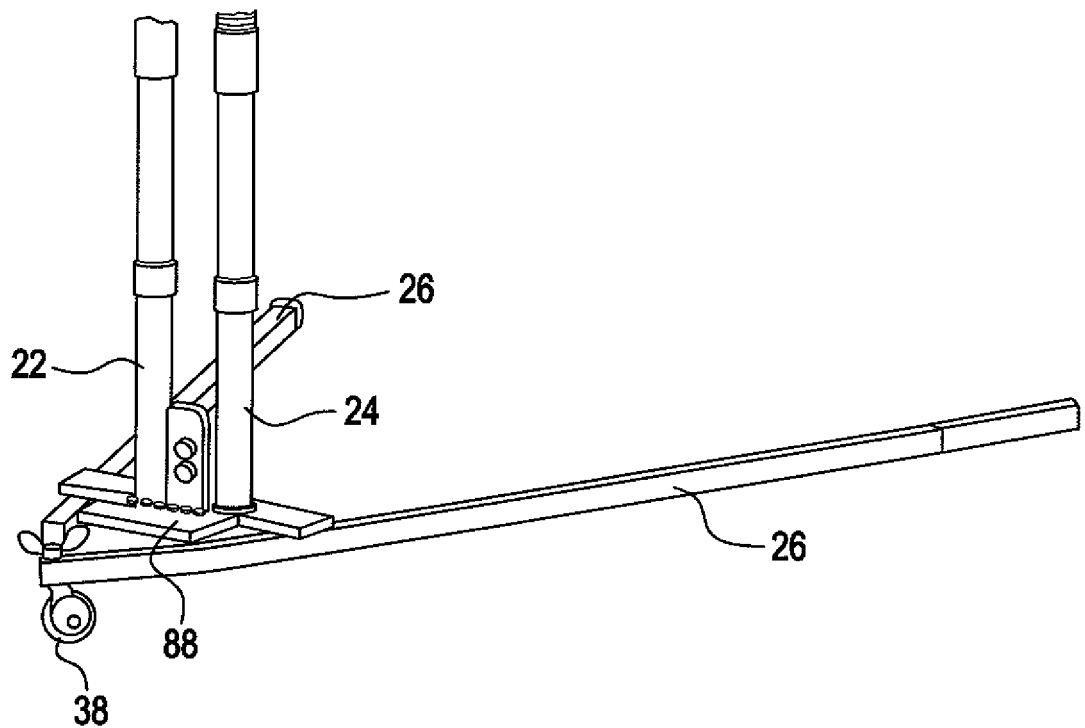
Figure 3:
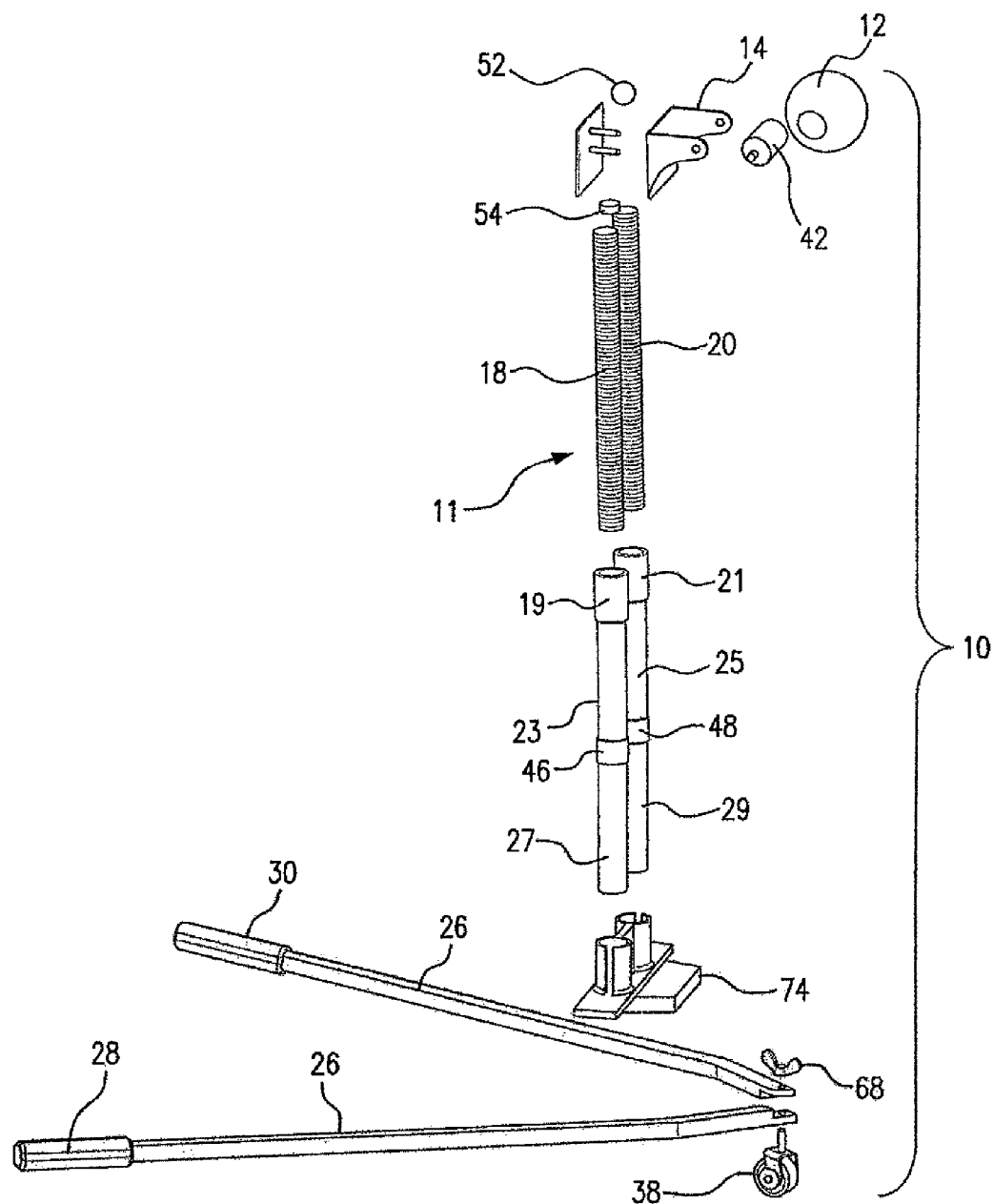
FIG. 3 is an exploded side view showing various components of the reciprocating ball sports trainer.

A first base assembly 74 (FIG. 1a) is mounted upon two longitudinal members or skids 26 which diverge from the base assembly point 74 as illustrated in FIGS. 1a-3. The base arms 26 act as a base to support the springs 18, 20, the housings 22, 24 and the electronics and illumination devices used to operate the reciprocating ball sports trainer 10. Each of the base arms 26 is provided with separate handles 28, 30 for ease of moving the reciprocating ball sports trainer 10 from one location to another location. FIG. 1 includes a wheel or roller 38 attached to the ends of each of the base legs 26 at the end opposite the handles 28, 30. A butterfly nut 68 (or similar device) as shown in FIG. 3 attaches the wheel or roller 38 to the connection point of the base legs. As illustrated in FIG. 5, a skid pad 56 or similar device can be substituted for rear wheel or roller 38. As can be appreciated, striking the ball 12 with the roller 38 attached to the base legs 26 causes the reciprocating ball sports trainer 10 to move more easily than having the skid pad 56 attached to the skids 26.

As shown in FIG. 7, two load cells 32, 34 are provided on or immediately above the base assembly 74 for use in determining whether a ball 12 is properly struck by the individual. One load cell 32 measures the lateral motion of the springs 18, 20 and the second load cell 34 measures any reciprocating movement of the springs 18, 20 when the ball 12 is struck. The load cells are mounted to the bottom base plate of the device with one on top of the other. The lower load cell 34 is mounted vertically and the upper load cell 32 is mounted horizontally. The lower load cell 34 detects the amount of front 120 to back 122 torque applied to the base 74 when the ball is hit, and the upper load cell 32 detects the amount of rotational, or side 124 to side 126 torque applied to the ball 12 and upper assembly tubes 22, 24. The load cells are able to measure the amount of torque and the rate at which it is applied. The electrical signals from the two load cells are sent to the microprocessor 129 (FIGS. 12-13) via their own wiring harness. That signal will then be used to calculate the amount of energy applied when the ball 12 was struck. By continually monitoring this information, the microprocessor 129 will be able to determine how hard the ball was hit, the direction, and where in the arc the ball is located. This information will also be used to calculate what the trajectory, and velocity of the ball would have been, if the ball 12 were in free play. Calculations within the microprocessor graph the movement of the ball like that of a sinusoidal wave and the zero line is referenced as the zero point of the arc. A graphic representation of the movement of the head looks very much like that of an EKG, or cardiac strip used by a doctor or a paramedic to monitor a Heartbeat. This "STRIP" as it's called, is used to evaluate the player's performance. These same measurements are also transmitted (option set via the control panel by the user) to a website, or any other electronic device. This information along with the other data can be used for interactive games, or coaching. It is also used for Live Interactive Tele-Present Coaching, or "Tele-Coaching." For Example, a student purchases a device, and that student has an internet connection. The student is able to send a live video stream of them, from a remote camera linked with the device. That video and data are then streamed from the device to a coach at a remote location. The coach can then monitor and give real time feedback to the student. Another example is going on vacation and still getting one's tennis lesson while half a world away.

Figure 6:
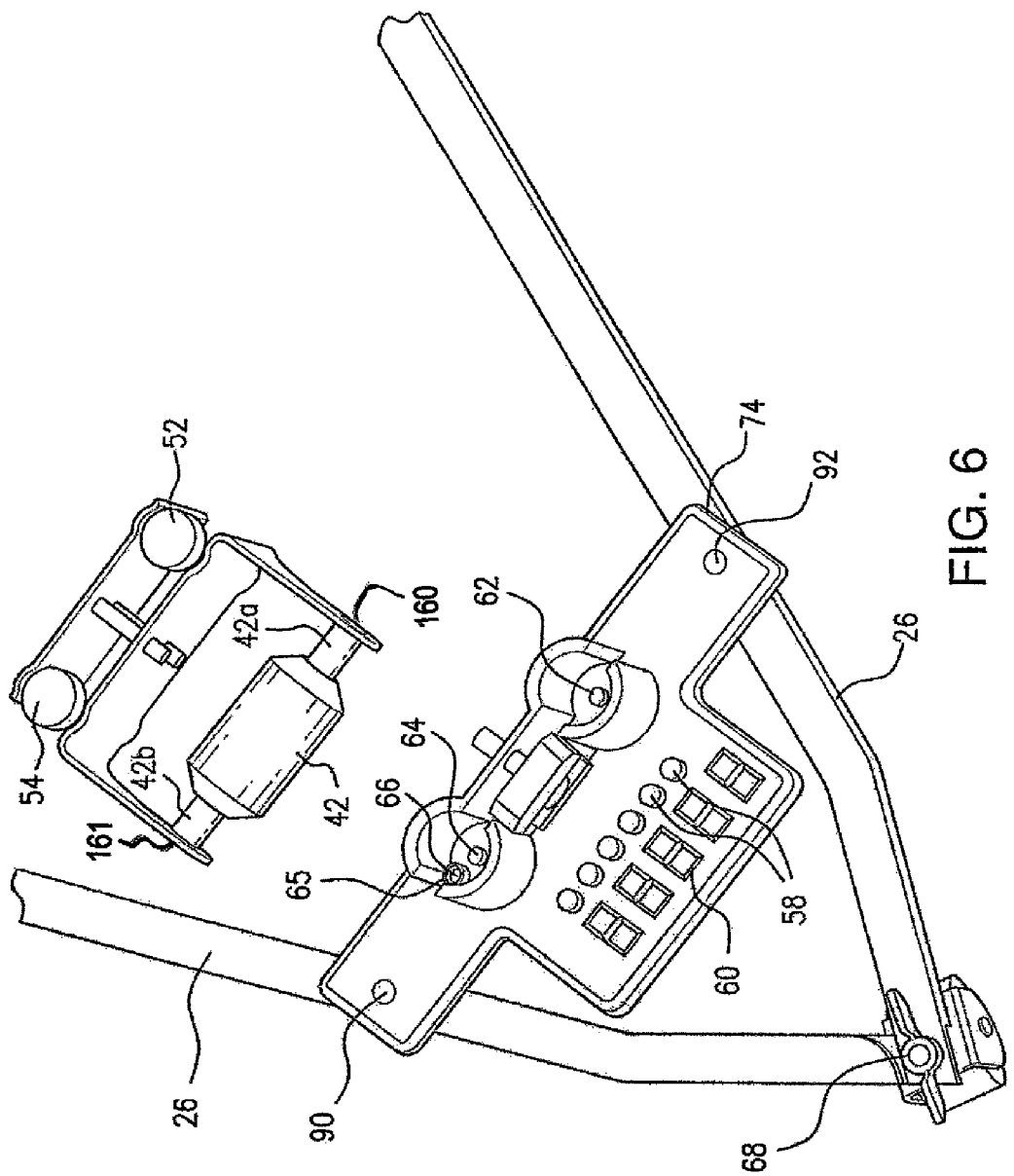
FIG. 6 shows various components of the reciprocating ball sports trainer.

FIGS. 3, 6 and 7 illustrate the reciprocating ball sports trainer 10 of the present invention with various components removed from an operational reciprocating ball sports trainer 10 for ease of illustration. As shown in FIGS. 1 and 4, the ball 12 is provided between the two arms 13, 15 of the ball mount 14. A ball motor/generator 42 is provided in the interior of the ball 12. The ball motor/generator 42 is designed to allow the direction of rotation as well as the speed of rotation of the ball 12 to be detected and measured. The ball motor/generator 42 includes an armature and rotor mounted within a small tube provided within the ball 12 itself. The two ends 42a, 42b of the ball motor/generator 42 secure the ball 12 to the ball mount 14 through the use of two end caps 16, allowing the ball 12 to rotate between the two arms 13, 15 of the ball mount 14.

Figure 10:
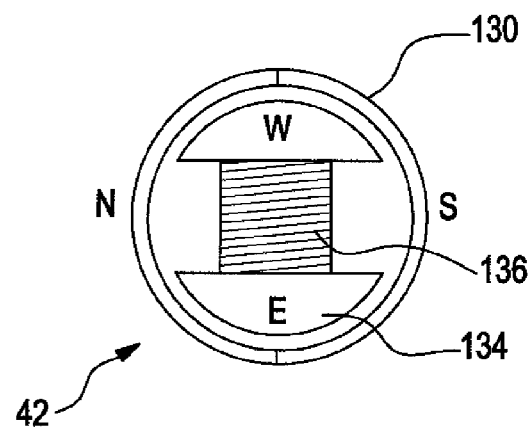
FIG. 10 shows an end cutaway view of the ball motor generator of the present invention.
Figure 11:
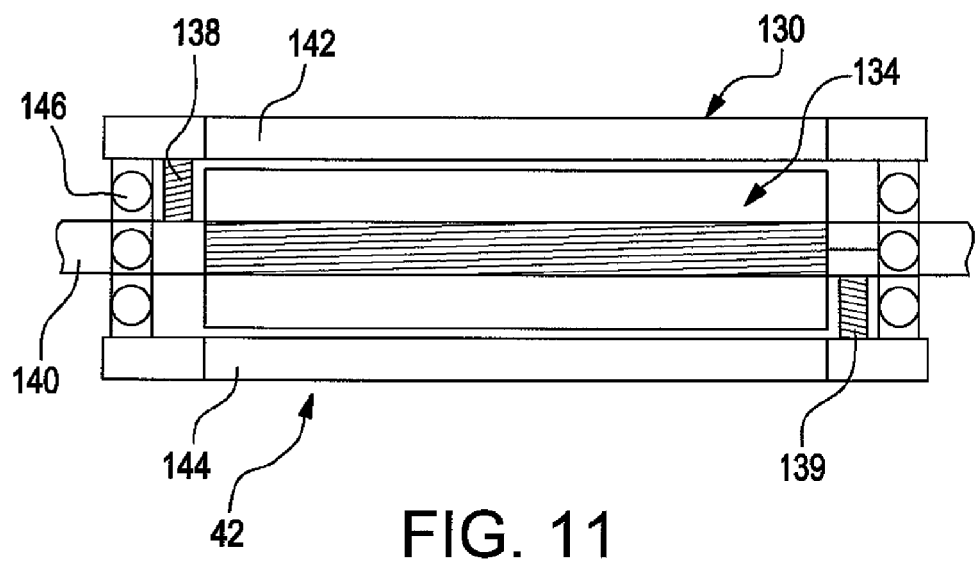
FIG. 11 shows a side cutaway view of the ball motor generator.
Figure 12:
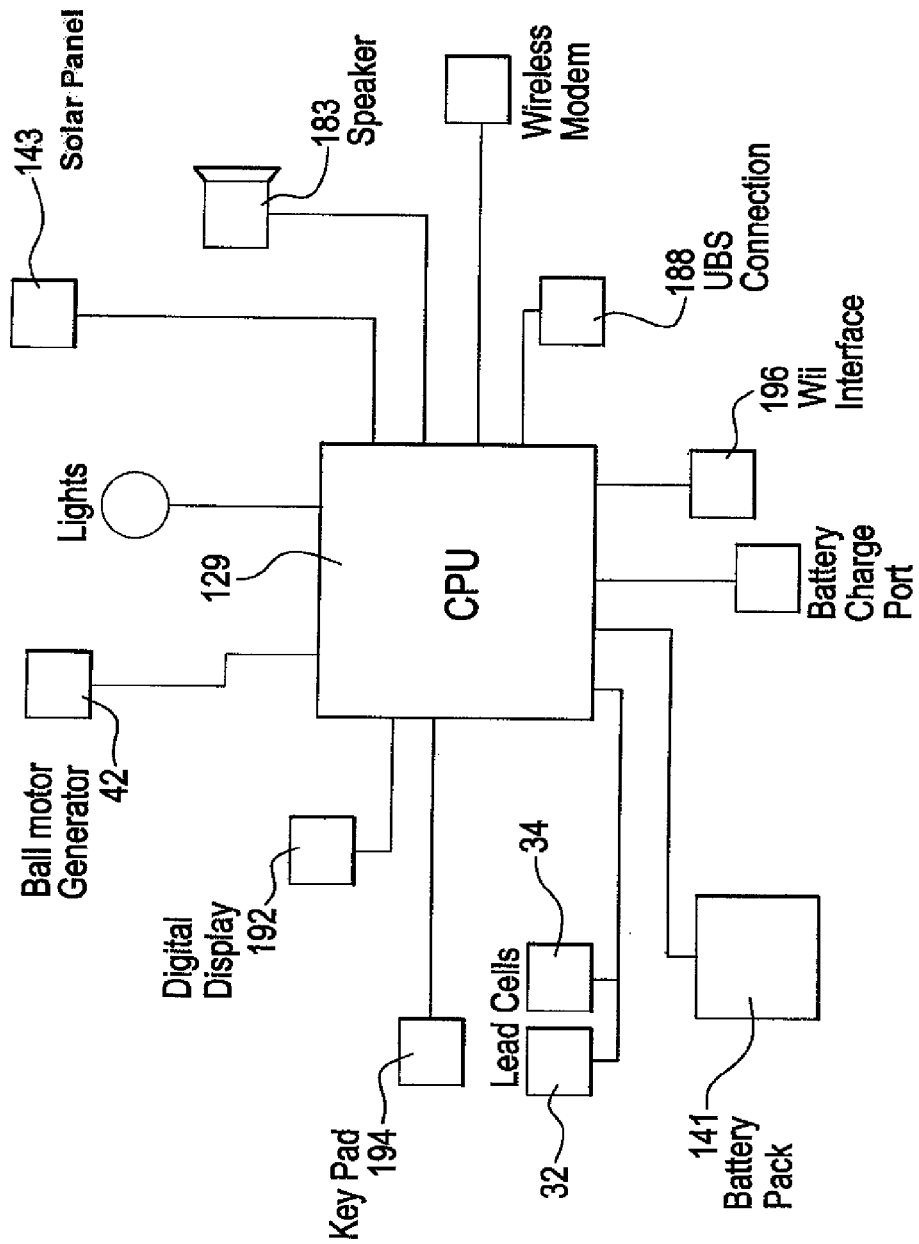
FIG. 12 shows a schematic representation of the electrical circuitry of the present invention.
Figure 13:
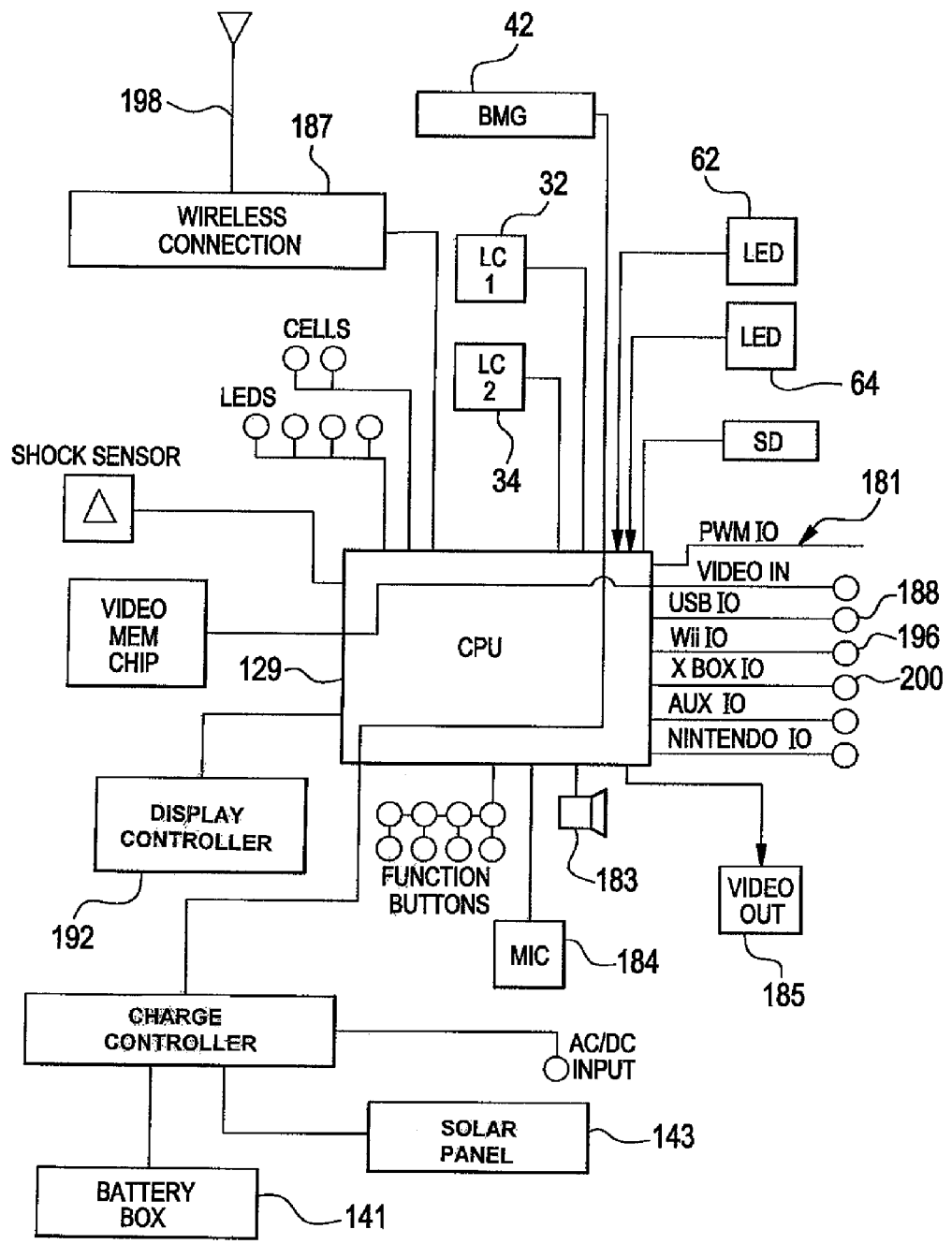
FIG. 13 shows a schematic representation of further electrical circuitry details.

With particular reference to FIGS. 6 and 10-11, the ball motor generator 42 is a small DC electric motor/generator located within the axle shaft of the ball. It consists of an armature or rotor 130 (outer portion of the shaft attached to the ball) and a stator 134 (inner portion) having plural windings 136 and mounted on the ball mount 14. Brushes 138 on the armature 130 are spring biased (139) to engage the support shaft 140. Armature 130 includes permanent magnets 142, 144. Ball bearings 146 facilitate rotation of the armature 130 with respect to the stator 134. When the ball 12 spins, the rotation of the armature 130 begins inducing a voltage into the stator 134. The output voltage and polarity of the ball motor generator 42 are determined by the speed, and direction of rotation and reproducibly represent values of speed and direction of rotation. This information is continually sent to and monitored by the microprocessor 129 to determine whether top or backspin was applied to the ball and how much. The polarity of that output voltage determines the direction of spin, and the amount of voltage used to determine the speed of rotation and amount of spin. The microprocessor 129 captures the voltage levels, and the electrical power that is generated is even re-used via a capacitor. The electrical energy stored in the capacitor bank is then used to recharge the batteries 141 (FIGS. 12-13). Additional recharging capabilities come from the solar panels 143 (FIG. 13) under the display panel. The energy generated is used to power the device, which upon external "spin control" commands via the Wi-Fi interface making the ball spin in either direction. This technique is for a trainer to change the ball dynamics which provides the student with another level of interaction with the device. By being able to place a spin on the ball, a trainer can provide an additional level of interactive game play, or practice session.

The electrical energy that travels to and from the ball motor generator is done through electrical conductors 160, 161 (FIG. 6) on both ends of the axle that contains the ball motor generator. From the ball motor generator 42, electrical conductors 160, 161 or wires transmit the electrical signals to the microprocessor 129 at the base 74 of the unit. The same wiring harness provides connectivity with the LEDs and a photoelectric cell located alongside the LEDs within the base. That wiring harness then connects to the main control box and is wired directly into the onboard microprocessor 129.

Figure 8:
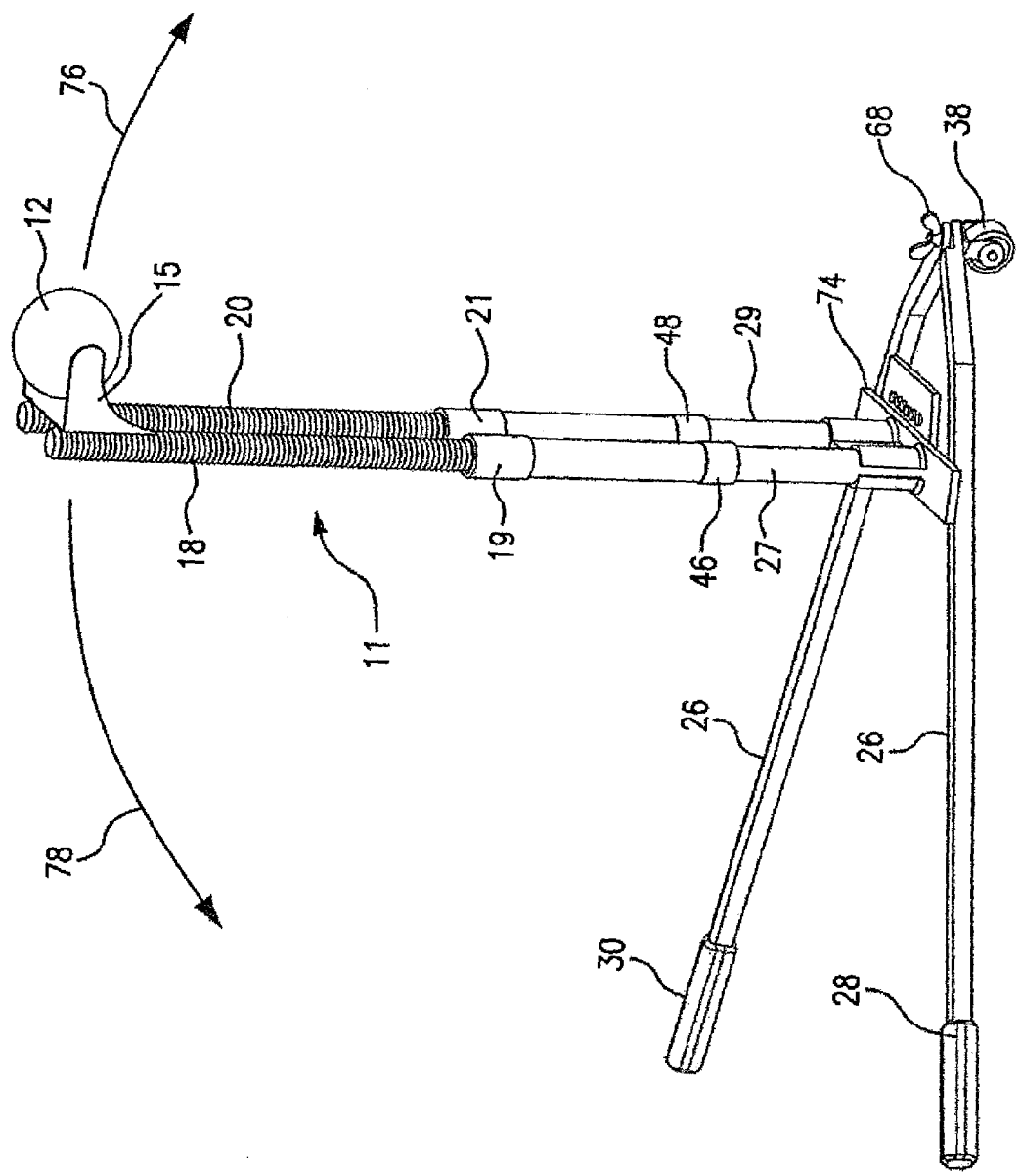
FIG. 8 is a side view of the reciprocating ball sports trainer showing the motion of the ball.

Once the ball 12 is struck by the tennis racket or other device, the ball 12 moves about an arc 76, 78 as shown in FIG. 8 through the pivoting movement of springs 18, 20. If desired, the tension of the springs 18, 20 may be adjusted in a manner well known by those skilled in the art for slow, medium, or fast return flexing. However, the housings 22, 24 are fixed in place but slightly flex in both a traverse and/or lateral direction based upon the manner in which the ball 12 has been struck. At this time, as will be explained, the rotation, direction, as well as speed of acceleration and deceleration of the ball 12 are detected by the motor generator 42. This information is transferred to the microprocessor 129 (FIGS. 12-13) provided in the base assembly 74 of the device. In operation, the rotor 134 is fixed and the armature 130 spins around the rotor of the ball motor/generator 42 (FIGS. 10-11). The rotor is connected to the end cap 16 and two small wire 160, 161 (FIG. 6) transmit the electrical signal sent by the ball motor/generator 42 to the rear 17 of the ball mount 14 to which the two small wires are connected to small electrical contacts. These electrical contacts allow the electrical connection to be transferred from the ball motor generator 42 down through the flexible support assembly 11 to the microprocessor 129 provided in the first base assembly 74. Two additional electrical contacts are connected directly to the microprocessor 129 allowing the processing of the motor/generator signals to take place. Additionally, as will be subsequently explained, signals from the ball motor/generator 42 as well as signals received from a timing light and the load cells (or sensors) 32, 34 are also processed and stored within the microprocessor 129. As best shown in FIG. 7, the lateral load cell 32 is provided between the springs 18, 20, at a small distance above the base assembly 74. Similarly, the reciprocating load cell 34 is also provided between the base of the springs 18, 20 and immediately above the top of the base assembly 74.

The lateral load cell 32 and the reciprocating load cell 34 are designed to determine the positioning of the ball 12 by measuring the amount of load that is applied to the base assembly 74 of the reciprocating ball sports trainer 10. The reciprocating load cell 34 determines the position of the ball 12 with respect to vertical by determining the amount of pressure that is applied either in a forward or reverse direction from the center portion of the ball 12 based upon the torque that is sensed by the load cell 34. When the ball 12 is in the zero position, the springs 18, 20 are perfectly aligned straight up and down from the ball mount 14 to the base assembly 74. When the ball 12 is struck, the ball 12, the ball mount 14, and the springs 18, 20 will move away from the point of impact in a positive direction 78 as shown in FIG. 8. As the ball 12 moves further from the zero position to the furthest point away (direction 76) from the center of the arc as shown in FIG. 8, the amount of torque applied to the reciprocating load cell 34 increases. As this distance increases in the positive direction 78, the pressure on the base assembly 74 as well as the load cell 34 is also increased. The reciprocating load cell 34 measures the torque and provides a reading to the microprocessor 129 to determine approximately how far the ball 12 has traveled from the zero point. This measurement allows for the determination of the approximate amount of energy that has been applied to the ball 12 to determine how far and how fast the ball 12 would have traveled from the point of impact, if the ball 12 were not attached to the reciprocating ball sports trainer 10.

As the ball 12 starts to come back toward the center or zero point, the amount of torque applied to the reciprocating load cell 34 decreases which is detected. Once the ball 12 reaches the top dead center or zero point and passes into the negative portion of the arc 76, this motion is detected by the reciprocating load cell 34 to measure how long it took for the ball 12 to cycle, as well as to what speed the ball 12 was traveling as it passed over the zero point. Once the ball 12 has reached its maximum travel distance across the arc and into the negative territory 76, the reciprocating load cell 34 determines how far past the center point into the negative portion of the arc the ball 12 has traveled. As the ball 12 begins to travel back toward the zero point once again, the reciprocating load cell 34 detects this movement as well.

Once the ball 12 reaches the zero point for the second time, it will then travel into the positive portion 78 of the arc and begin to return toward the zero point for the third time. When the ball 12 reaches the top dead center point or zero point for the third time, this is the precise moment of the desired impact by the user. By calculating whether or not there was a positive or negative force, or no force at all upon the ball 12 at the time of impact, the system can determine whether or not the ball 12 was struck early, late or precisely at the optimum point of contact, which is the zero point. By monitoring each individual impact as well as the oscillation of the ball 12 and the ball mount 14; the present invention itself determines whether or not the user is contacting the ball 12 early, late or exactly as desired.

When the ball 12 is struck the first time, it moves to the maximum forward position in the arc. As it returns towards the top dead center for the first time, the user does not have enough time to get the racket in place again to hit it before it reaches to top dead center for the first time. As it passes top dead center for the first time, it is moving toward the maximum negative point in the arc. Once it reaches that point, the ball 12 then starts to travel towards the positive side of the arc. Once it reaches the top dead center for the second time, it is traveling in the same direction as the user would be swinging. However, the user would not have enough time to swing at the ball 12 a second time. As the ball 12 reaches the maximum forward point of the arc for the second time, and the ball 12 has now passed the top dead center twice, the user can then begin their next swing. The goal is to have the user's racket hit the ball 12 at the exact same time that the ball 12 reaches the top dead center for the third time which is when the ball 12 is traveling in the opposite direction as the racket, and a solid hit can be applied to the ball 12.

If no lateral roll is sensed by the reciprocating ball sports trainer 10, particularly by the load cell 32, this means that the user has struck the ball 12 so that it has traveled without any angle with respect to the user. However, during a tennis match, there are many instances in which the player might wish to strike the ball 12 so that it would angularly move left or right with respect to the player.

The lateral load cell 32 is used to determine the amount of lateral roll or angulation from vertical, if any, has been produced when the user impacts, as well as the side spin sensed in conjunction with the ball motor/generator 42 the ball 12. This is done by calculating the amount of torque applied to the ball 12 in a left or right direction, as opposed to the normal arc of travel as shown in FIG. 8. As shown in FIG. 4, the bolts 50 attach the back plate 49 to the ball mount 14 in a manner in which the ball 12 is not angled with respect to the back plate 49. However, additional holes (not shown) may be provided in the rear of the ball mount 14 to allow the ball mount 14 to be adjusted at a particular angle, such as, but not limited to, 45 degrees to the left or to the right. This is accomplished by attaching the bolts 50 to the back plate 49 using holes provided in the back plate 49 to the left or right of center of the back plate 49. When the ball mount 14 and thus the ball 12 is adjusted either to the left or to the right, and the user attempts to put side spin, back spin or top spin on the ball 12, the lateral load cell 32 is able to detect the amount of side torque or twisting of the ball 12 in the left or right direction. By measuring and calculating the amount of force that is applied, the present invention will determine whether the user is hitting the ball 12 correctly, as well as how much lateral movement from the normal arc shown in FIG. 8, a particular swing has provided. In addition, each impact can be registered and recorded by remote electronic devices or later reviewed by the user or an instructor. In addition, the function buttons 58 shown in FIG. 7 allow the user to change the amount and type of information which is measured and recorded. In addition, some of this information is directly provided to the user by the digital display 60.

In addition to sensing when an individual has properly struck the ball 12 as well as to determine various other parameters of the ball striking ability of the individual, the present invention assists the individual hitting the ball 12 at the proper location, i.e., the sensor zero point. In FIG. 6, the base assembly 74 is provided with a first illumination device including a light emitting diode 62 provided directly under the housing 24. The illumination produced by the light emitting diode 62 is directed upward through the housing 24 and the hollow spring 18 to a timing light lens 52 (FIGS. 4 and 6) attached to the top of the spring 20. The light emitting diode 62 shines up through the spring and impacts the bottom of the timing light lens 52 only when the spring 20 is perfectly vertical with respect to the base assembly 74. The lens 52 has a reflective coating on its bottom surface that reflects much of the light back down toward the LED 62, however, when light strikes the lens 52, enough light shines through the reflective coating that the lens illuminates, the illumination clearly visible to the user and signifying that the spring 20 is perfectly vertical, the optimal orientation at which to strike the ball 12. When the ball 12 is struck by the individual, springs 18, 20 move in positive and negative directions away from the zero point. When this occurs, at times when the spring 20 is not perfectly vertical above the base assembly 74, the light emitted by the light emitting diode 62 is blocked by the bending of the spring 18 and thus the illumination of the light emitting diode 62 no longer strikes the timing light lens 52 and thus is not reflected back down the tube assembly to be detected by the photo electric detector 66. As the ball 12 travels back to the zero position and comes into perfect alignment with the light emitting diode 62 in the base assembly 74, the path of the light produced by the light emitting diode 62 is no longer blocked by the spring 20 and the timing light lens 52 becomes illuminated again by direct line of sight by the emitting diode 62 located within the base assembly 74. Again, the light hitting the timing light lens 52, visible to the user, indicates to the user the proper time to strike the ball 12 which is when the ball passes over the zero point of the arc.

A second illumination device including a light emitting diode 64 (FIG. 6) is provided in the bottom of the base assembly 74 and is aligned with the housing 22 and the spring 18. The top of the spring 18 is provided with a timing light reflector 54 (FIGS. 4 and 6). The reflector 54 reflects light from the LED 64 back toward the LED 64. When the reflected light reaches the base, it is detected by photo transistors located beside and shielded from the LEDs such as the detector 66 (FIG. 6) shielded by the tube 65. This electrical signal is constantly monitored by the microprocessor and compared to other signal inputs from the device in real time. Similar to the light emitting diode 62, light emitting diode 64 produces a beam of light directed from the base assembly 74 up through the housing 22 and the spring 18 which strikes the timing reflector 54 only when the spring 18 is vertical with respect to the first base 74. As is the case with the lens 52, the timing reflector 54 allows enough light to shine through its reflective coating so that it glows and indicates to the user that the spring 18 is perfectly vertical. Since the springs 18 and 20 are perfectly vertical simultaneously, use of phototransistors adjacent the light source 62 is optional. The lens 52 and reflector 54 are both provided so that regardless of whether the user is right handed or left handed, they can clearly see the glowing of at least one of them when the ball 12 is perfectly vertical. Therefore, the light produced by the light emitting diode 64 only strikes and illuminates the timing light lens 52 when the spring 18 is in the zero position. The first base assembly 74 is provided with an illumination sensing device including a photo detector 66 provided in a cylinder 65 in proximity with the light emitting diode 64. The purpose of the cylinder 65 is to prevent cross-contamination of the light between the light emitting diode 64 and the photo detector 66. The main purpose of this timing light is to determine if the user has struck the ball 12 at the proper time when the ball 12 passes near the zero point within the arc. It is noted that both the timing light lens 52 and the timing light reflector 54 illuminates the top of the springs 18, 20 at the same time and the tops of the springs 18, 20 become dark at the same time.

To determine whether the ball 12 has been properly struck on its return arc toward the zero point prior to impact, the microprocessor 129 of the present invention is looking for signals from the lateral load cell 32, the reciprocating load cell 34, as well as the zero point detector associated with spring 18. If the present invention detects an impact of the ball 12 without detecting the pulse from the photo cell 66, the impact was not correct and would not be considered a good hit. If the system of the present invention detects the pulse received from the photo cell 66 and no impact is detected for a period of time before and after this pulse is detected, then it would be determined that this hit was not correct. The proper correlation between the impact of the ball 12 and the detection by the photo cell 66 also indicate whether the hit was late or early. The amount of impact as well as the amount of time passing between the impact sensed and the zero point is detected, can be programmed or changed within the unit to determine a window of what would be considered a good or bad hit. The present invention is able to determine whether an impact at the zero point or any degree positive or negative of that zero point can be determined as to what would be considered as a good hit.

Figure 9:
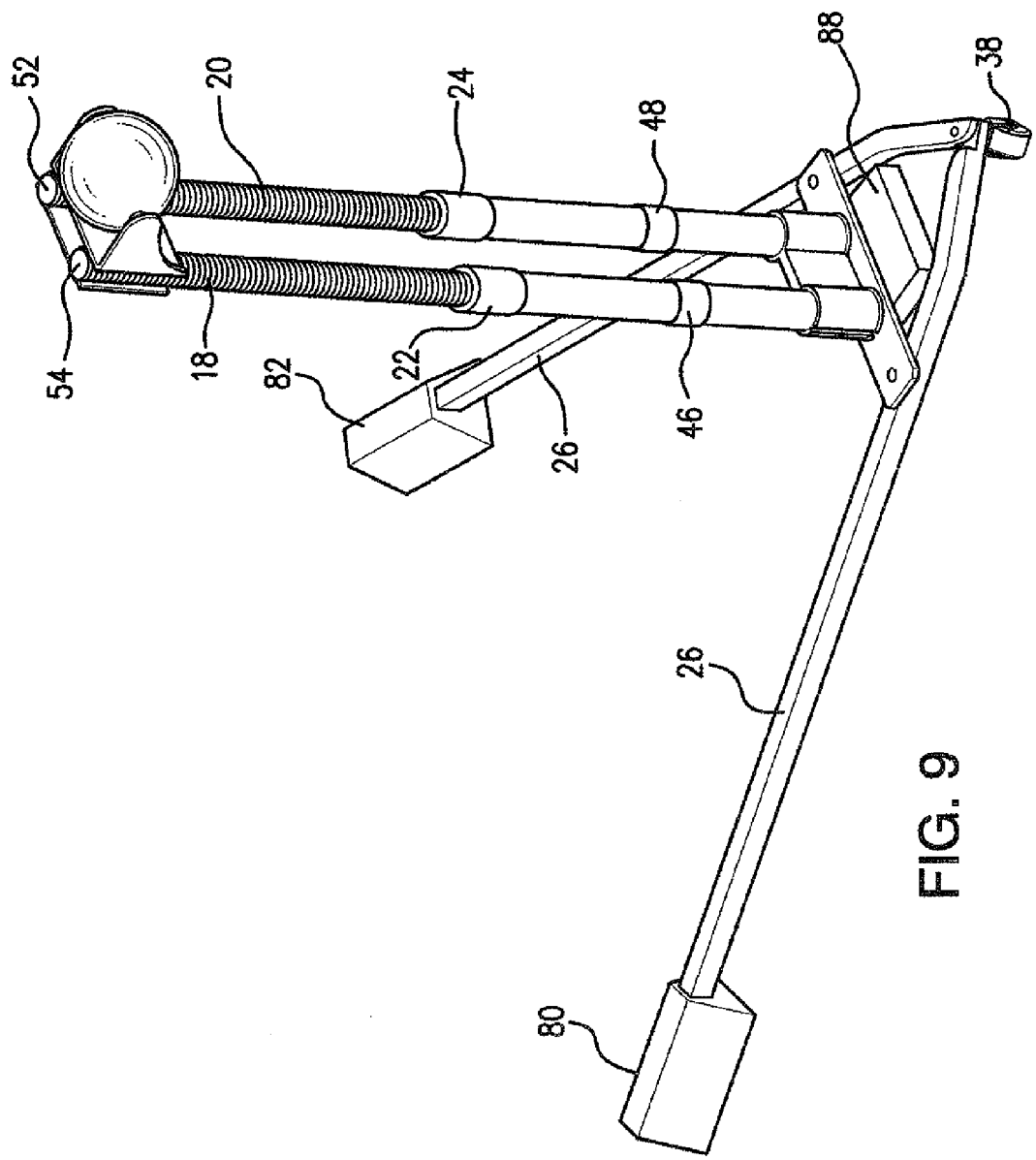
FIG. 9 is a perspective view of the reciprocating sports trainer showing the use of skids.

As shown, for example, in FIGS. 1 and 2, a roller or wheel 38 is located at the point the longitudinal members of the leg base 26 converge together. The purpose of the wheels or rollers 38 is to allow the user to move the device around the training area. Additionally, although a single roller wheel 38 is shown in FIGS. 1 and 2, the unit can be provided with additional rollers to best achieve the amount of movement and direction of movement required by the user. Each time the ball 12 is struck, the impact carries through the base unit and propels the unit forward based upon the amount of energy applied to the ball 12 by the impact. The roller or rollers on the base of the unit have a resistance capability that can be adjusted to allow for the amount of roll desired by the user. This resistance is created by loosening or tightening the butterfly nut 68. In addition to the amount of roll, the direction of each of the rolls so as to allow the device to roll in a particular direction each time the unit is impacted by the user. This will make it necessary for the user to reposition himself or herself next to the device each time the user wishes to impact the device or swing at the device. The rollers can be used by themselves or in combination with a pad or skid 56 as shown in FIG. 5. The use of the pad 56 prevents the unit from moving after each impact or moving very little in combination with a roller or the pad 56. The pad 56 can be placed on the bottom of the unit to allow it to slide on different types of surfaces such as tennis courts, pavement, wooden floors, carpeting or any other type of flooring or ground material. The pad 56 may be made of any suitable material such as plastic, wood, metal and may, if desired, be covered with a cover or coating to facilitate the desired degree of friction. The device shown in FIG. 5a utilizes elongated springs 31, 33 extending from between the ball mount 14 and the back plate 49 and the base 74 instead of the springs 18, 20 and the housings 22, 24 shown in FIG. 3. Additionally, as shown in FIG. 9, skid pads 80, 82 can be provided at the end of each skid 26 which would also affect the manner in which the training device would move when the ball 12 is struck.

As previously explained, FIGS. 6 and 7 show the use of the first base assembly 74 providing a digital display 60 as well as a plurality of function buttons 58. The function buttons 58 may be arranged in multiple rows including rows above and below the display 60. Function buttons 58 may be pushed to control on/off of device, on/off of WiFi connection, synchronization with WiFi, dump data to the USB port 188 (FIG. 12), control operation of the speaker 183 (FIG. 12), clear stored data, control operation of the microphone 184 (FIG. 13), cause data to be displayed on the display 60, cause training data to be stored in the CPU 129 (FIG. 13), to control operation of the USB port 188, control operation of the Wii port 196 (FIG. 13), and control connection to an external device such as an X Box via the port 200 (FIG. 13). The display 60 can display items including amount of practice time elapsed, total hits, total good hits, remaining practice time, whether ball spin has been initiated, indicate on/off status and/or provide a system ID. This first base assembly 74 is attached to the longitudinal base legs 26 at points 90, 92, the longitudinal base legs 26 forming a second base assembly. The microprocessor 129 for controlling operation of the present invention is also housed in the base assembly 74 as well as being powered by one or more batteries or similar devices stored in power pack 88 shown in FIG. 9. The present invention has a variety of different capabilities and functions and can provide a wide range of information not only to the user, but to a coach or instructor as well as uploading information to a website via the Internet. The present invention can be provided with an I-O port that is capable of being interfaced with a wide variety of different electronic devices or components, for example, the I-O port can be plugged into a home computer or a device such as a Wii such that remote information and remote players can be interfaced to the unit such that a semi-reality practice match with professionals or other players in other locations can be conducted utilizing the microprocessors. The present invention can also be interfaced with a home game station so that users can practice against computer-generated professionals to help hone their skills. As previously indicated, the present invention can count the number of good hits, bad hits, total number of hits, as well as a percentage of good or bad hits. The present invention can run software programs and allow the unit to provide lessons and determine if the user has reached a skill level that can be programmed by the user or instructor.

With particular reference to FIGS. 12-13, the microprocessor 129 connects to all of the electronics in the device. There are several Input/Output (I/O) signals and ports on the device such as a Pulse Width Modulation (PWM) I/O 181 signal, an Audio Output (Speaker) 183, as well as for Video Output 185, and Data signal outputs. The device will also have multiple wireless capabilities, such as Bluetooth or Wi-Fi wireless connections 187 to routers. These interfaces with other electronic devices provide for remote interaction, training, and programming. The main function is to monitor and record all inputs, calculate that raw information, and provide real-time feedback. A "Good Hit" is determined by only one thing, and that is the ball being hit when it is in the top dead center position. The device has several ways of detecting this. First, reflected light 62, 64 must be detected. Second, the shock of an impact is detected at the same time, and the load cells 32, 34 show that the head has changed to the forward direction at the top dead center, and it is moving at a greater velocity than when it entered that position. The level of force applied to the ball is also considered when calculating a Good Hit. That level, along with all other I/O's can be adjusted in the programming. The device can be programmed by the user or remotely to have goals, and what type of information to be displayed. This information will consist of percentages, number of good or bad hits, numbers of hits needed, times, dates, calories burned, temperature, and solar, and voltage levels. It can also remind you to put on sunscreen. This is achieved by monitoring the input voltage level from the solar panel 143. The voltage output from the solar panel 143 is designed to be sufficient to facilitate relatively rapid recharge of the batteries 141. It will also tell you if it is not getting enough sun to recharge, and can even sound an alarm to remind you of your tennis lesson. This can be programmed via any of the aforementioned ways. It can also be synched to your calendar book. The device can be set up via the control panel to also email, and have performance records remotely printed. In addition to being able to provide pre-recorded voice responses, it has a speech recognition function that will allow the user to speak their requests rather than have to key them in. All inputs can be done from the touch screen, the control buttons, via tablets or smart phone devices and gaming stations through the internet (global computer network) interface (Wi-Fi) (via means for so connecting) or by voice commands. Voice commands, sound prompts, and other audio signals are pre-programmed into the device as well. These are triggered by how well the student is performing. All of these parameters will be programmed into different levels, and multiple voice responses will randomly be given via speaker 183 for the same result. i.e.: "Well done", "Good job", "That's the way", "Way to go", and several others, will be pre-programmed audio type responses generated from the device for a good hit. A microphone 184 (FIG. 13) may be provided to allow communications between a user and the microprocessor 129. A USB port 188 (FIG. 13) is provided to allow easy transfer of data stored in the microprocessor 129. The microprocessor 129 may be coupled to an "X Box" or Nintendo device as desired, wirelessly or directly.

The display 192 allows display of data resulting from use of the inventive device in a suitable format for easy viewing and understanding. The data to be displayed can include amount of time practiced, total hits, total good hits, remaining practice time, direction of ball spin, an indicator showing that the device is operable as well as log-in information. Also associated with the microprocessor 129 is a keypad 194 allowing inputting of commands to the microprocessor 129. A Wi-Fi interface 196 (FIGS. 12-13) allows wired connection to the Internet while a wireless connection 187 also has an antenna 198 to facilitate wireless Wi-Fi connection. These Wi-Fi connections permit communications with remote teachers.

As illustrated in FIG. 4, the present invention is provided with a spin retarder 40. The spin retarder is used to decrease the amount of rotation of the ball 12 once impacted by the user. The spin retarder 40 is composed of two opposed discs provided between the end cap 16 and the ball 12, each disc provided on either side of the ball 12. These discs apply friction to the rotation of the ball 12. As the amount of friction is increased by adjusting the pressure on the two discs, the amount of rotation of the ball 12 is retarded. The purpose of the ball spinner retarder is to allow the user to increase the amount of top spin or back spin applied to the ball 12 with each hit. If little or no friction is applied to the ball 12, can spin freely makes it very difficult to determine how much top spin or back spin was applied to the ball 12 each time it was hit. As the amount of resistance is increased, the amount of rotation decreases and allows for the user to determine whether they are applying a substantial or significant amount of top spin or back spin to the ball 12 with each hit of the ball 12.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A ball sports trainer for assisting an individual to practice hitting a ball with an implement, comprising:
   a flexible support having a top end and a bottom end;
   a ball attached to said flexible support in proximity to said top end;
   a base supporting said flexible support; and
   a first illumination device provided in said base for projecting a first beam of light upward from said base through said flexible support directed toward said top end of said flexible support;
   wherein when the individual hits said ball with the implement, said ball and said top end of said flexible support move in a reciprocating arc through a top dead center point, and further wherein said top end of said flexible support is illuminated by said first illumination device when said top end of said flexible support passes through the top dead center point, indicating a proper time the individual should hit said ball with the implement.

2. The ball sports trainer according to claim 1, further including a reciprocating load cell attached on said base for sensing when the individual hits said ball as well as torque generated when the individual hits the ball.

3. The ball sports trainer according to claim 2, wherein said flexible support includes first and second springs.

4. The ball sports trainer according to claim 3, wherein said first and second springs are supported by a non-flexible hollow housing including a first section attached between said first spring and said base, and a second section attached between said second spring and said base.

5. The ball sports trainer according to claim 4, wherein said first section includes a first top tube member and a first bottom tube member inserted into said first outer tube member and said second section includes a second outer tube member and a second bottom tube member for adjusting the height of the sport training device inserted into said second outer tube member.

6. The ball sports trainer according to claim 3, further wherein said first illumination device projects said first beam of light through said first spring, and further including a second illumination device and an illumination sensing device provided in said base for projecting a second beam of light upward from said first base through said second spring, said illumination sensing device receiving a signal reflected from said top end of said flexible support when said second spring passes through said top dead center point.

7. The ball sports trainer according to claim 1, further including a motor/generator provided within said ball and a lateral load cell attached to said base, said motor/generator sensing an amount of spin provided when the individual hits the ball and said lateral load cell sensing lateral torque produced when the individual strikes the ball.

8. The ball sports trainer according to claim 1, further including first and second longitudinal members attached to said base for assisting in moving the reciprocating ball sports trainer.

9. The ball sports trainer according to claim 8, further including at least one roller or skid pad attached to said first and second longitudinal members used to control movement and braking of the reciprocating ball sports trainer.

10. The ball sports trainer according to claim 1, further including a U-shaped ball mount for mounting said ball to said flexible support and further including a ball spinner retarder provided between said U-shaped ball mount and said ball.

11. The ball sports trainer according to claim 1, further including a visual display provided on said base for displaying information related to the individual's use of the ball sports trainer.

12. The ball sports trainer according to claim 9, wherein said roller is attached to one end of said first and second longitudinal members in proximity to said base and further including skid pads attached to a second end of said first and second longitudinal members.

13. The ball sports trainer according to claim 11, further including a plurality of function buttons provided on said base for changing an amount and a type of information measured as recorded, as well as displayed on said digital display.

14. The ball sports trainer according to claim 10, further including a device for changing an angle of said U-shaped ball mount with respect to said flexible support.

15. The ball sports trainer according to claim 6, wherein said second spring has a top end at which a partially reflective lens is mounted, said lens reflecting said signal at said top dead center point and also glowing to indicate top dead center to said individual.

16. The ball sports trainer according to claim 5, wherein said respective top and bottom tube members telescope with respect to one another, and further including locking sleeves for releasably locking a telescoped relationship between said respective top and bottom tube members.

17. The ball sports trainer according to claim 7, wherein said motor/generator comprises a rotor attached to said ball and constrained to move therewith and a stator fixed to a mount for said ball, said stator including windings, whereby movements of said ball and rotor with respect to the stator and mount cause a voltage to be induced into said stator.

18. The ball sports trainer according to claim 17, wherein voltage induced into said stator is related to speed of rotation of said ball.

19. The ball sports trainer according to claim 13, further including a microprocessor receiving inputs responsive to operation of said function buttons to cause recording and display of information.

20. The ball sports trainer according to claim 19, wherein said microprocessor is connected to a gaming station.

21. The ball sports trainer according to claim 19, further including means for connecting said microprocessor to a global computer network directly or wirelessly.

22. The ball sports trainer according to claim 19, wherein said microprocessor is battery powered.

23. The ball sports trainer according to claim 22, wherein said battery is charged by a solar panel.

24. A ball sports trainer for assisting an individual to practice hitting a ball with an implement, comprising:
a flexible support having a top end and a bottom end;
a ball attached to said flexible support in proximity to said top end;
a base supporting said flexible support; and
a first illumination device comprising a light emitting diode provided in said base for projecting a first beam of light upward from said base through said flexible support directed toward said top end of said flexible support;
wherein when the individual hits said ball with the implement, said ball and said top end of said flexible support move in a reciprocating arc through a top dead center point, and further wherein said top end of flexible support is illuminated by said first illumination device when said top end of said flexible support passes through the top dead center point, indicating a proper time the individual should hit said ball with the implement, said flexible support comprising first and second springs each supported by a non-flexible hollow housing including a first section attached between said first spring and said base, and a second section attached between said second spring and said base, said first section including a first top tube member and a first bottom tube member inserted into said first outer tube member and said second section including a second outer tube member and a second bottom tube member for adjusting the height of the sport training device inserted into said second outer tube member.

25. The ball sports trainer according to claim 24, further wherein said first illumination device projects said first beam of light through said first spring, and further including a second illumination device and an illumination sensing device provided in said base for projecting a second beam of light upward from said first base through said second spring, said illumination sensing device receiving a signal reflected from said top end of said flexible support when said second spring passes through said top dead center point.

26. The ball sports trainer according to claim 24, further including a motor/generator provided within said ball and a lateral load cell attached to said base, said motor/generator sensing an amount of spin provided when the individual hits the ball and said lateral load cell sensing lateral torque produced when the individual strikes the ball.

27. The ball sports trainer according to claim 26, wherein said motor/generator comprises a rotor attached to said ball and constrained to move therewith and a stator fixed to a mount for said ball, said stator including windings, whereby movements of said ball and rotor with respect to the stator and mount causes a voltage to be induced into said stator.

28. The ball sports trainer according to claim 27, wherein voltage induced into said stator is related to speed of rotation of said ball.

29. The ball sports trainer according to claim 24, further including a microprocessor receiving inputs responsive to operation of said function buttons to cause recording and display of information.

30. The ball sports trainer according to claim 29, further including means for connecting said microprocessor to a global computer network directly or wirelessly.

* * * * *